(12) United States Patent
Keller (10) Patent No.: US 7,055,462 B2
(45) Date of Patent: Jun. 6, 2006

(54) FEEDER APPARATUS

(75) Inventor: Adam J. Keller, Neenah, WI (US)

(73) Assignee: Adam's Specialty Products, LLC, Neenah, WI (US)

( * ) Notice: Subject to any disclaimer, the term of this patent is extended or adjusted under 35 U.S.C. 154(b) by 75 days.

(21) Appl. No.: 10/837,872

(22) Filed: May 3, 2004

(65) Prior Publication Data

US 2005/0241592 A1 Nov. 3, 2005

(51) Int. Cl.
*A01K 5/00* (2006.01)
*A01K 7/00* (2006.01)
*A01K 39/01* (2006.01)
*A01K 1/10* (2006.01)
*A01K 39/00* (2006.01)

(52) U.S. Cl. .................... 119/475; 119/464; 119/61.51; 119/51.01; 119/61.5; 119/429; 119/61.57

(58) Field of Classification Search ................ 119/475, 119/429, 432, 459, 454, 452, 464, 467
See application file for complete search history.

(56) References Cited

U.S. PATENT DOCUMENTS

| | | | |
|---|---|---|---|
| 357,493 A | 2/1887 | McWilliams | |
| 1,159,540 A * | 11/1915 | Smith | 119/487 |
| 1,602,000 A | 10/1926 | Custer | |
| 1,694,082 A | 12/1928 | Sheehy | |
| 1,719,769 A | 7/1929 | Kaufman | |
| 1,869,901 A | 8/1932 | LeFever | |
| 1,900,868 A | 3/1933 | Ritchie | |
| 2,031,874 A * | 2/1936 | Ludovica et al. | 119/464 |
| 2,970,566 A | 2/1961 | Detrick | |
| 2,997,022 A * | 8/1961 | Kay | 119/61.31 |
| 3,100,474 A * | 8/1963 | Schneider | 119/166 |
| 3,361,116 A | 1/1968 | Daniel et al. | |
| 3,919,977 A * | 11/1975 | Clark | 119/464 |
| 5,152,247 A | 10/1992 | Brown | |
| 5,435,266 A * | 7/1995 | Carson | 119/464 |
| 5,950,567 A * | 9/1999 | Sheaffer et al. | 119/477 |
| 6,832,580 B1 * | 12/2004 | Marchioro | 119/452 |

* cited by examiner

*Primary Examiner*—Teri Pham Luu
*Assistant Examiner*—Joshua Michener
(74) *Attorney, Agent, or Firm*—Wilhelm Law Service, S.C.; Thomas D. Wilhelm; Eric J. Lalor (57) ABSTRACT

A feeder apparatus comprises a plurality of walls, mounting structure and a feed holder. The plurality of walls communicates with the mounting structure to accommodate mounting the feeder apparatus on the outside of an animal confinement structure, e.g. a cage. One or more walls of the feeder body and the feed holder have cooperating sliding structures, enabling the feed holder to be slidingly received into, and/or removed from the remainder of the feeder apparatus.

17 Claims, 6 Drawing Sheets

FEEDER APPARATUS

BACKGROUND

The present invention relates to feeder apparatus, e.g. feeding devices for providing food, water, dietary supplements, and other forms of sustenance or medicines to pets and/or other animals, housed in confine. Animal owners/caretakers house some animals e.g. birds, reptiles, rodents, mammals and other relatively common animals and/or relatively exotic animals, in the confines of a physical enclosure. Common physical enclosures used to house animals include rigid wire cages, tension wire cages, Plexiglass® acrylic enclosures, and others.

Animals require regular access to food, water, dietary supplements, and other forms of sustenance or medicines (hereinafter referred to as foodstuff) while housed in confine. Methods of distributing foodstuff, and the structure of apparatus adapted to distribute foodstuff varies as dictated by animal species in confine.

As one example, confined non-flight animals, e.g. reptiles, rodents, mammals and other animals which move about by generally non-flight means, can be fed via feeding devices located on the floor of the confining physical enclosure. Accordingly, non-flight animals are frequently administered foodstuff via feeding devices, e.g. bowls, troughs and other devices, which sit on the floor of the confining physical structure.

As another example, confined flight animals, e.g. bird and/or other animals which enjoy perching elevated above the floor of the confining physical enclosure, may prefer consuming foodstuff at an elevated location. Accordingly, some flight animals are administered foodstuff via feeding devices which are elevated above the floor of the confining physical structure. Often, the feeding devices are attached to an inside wall of the confining physical structure so as to present foodstuff to the confined animal at an elevated level.

An animal owner/caretaker must routinely perform maintenance tasks to ensure the health of the confined animal. Some routine maintenance tasks include reaching inside the confining physical structure to fill the feeding devices with foodstuff, and/or to clean/maintain the feeding devices. In the alternative, the animal owner/caretaker must routinely reach inside the confining physical structure, to remove the feeding devices, in order to fill the feeding devices with foodstuff, and/or to clean/maintain the feeding devices outside of the confines of the physical structure.

In some situations, the animal owner/caretaker may prefer to not reach inside the confining physical structure while performing the aforementioned maintenance tasks. For example, some animals kept in confinement are dangerous and/or deadly. An animal owner/caretaker may prefer to avoid reaching inside of the confining physical structure with a dangerous and/or deadly animal. As another example, some confined animals are relatively quick and/or agile and thus may be relatively more prone to escape. An animal owner/caretaker may prefer to avoid reaching inside of the confining physical structure, and thus providing an opportunity for a relatively quick and/or agile animal to escape.

Some known feeding devices are accessible to the animal owner/caretaker from outside of the confining physical structure. Conventional feeding devices of this type mount to a side wall of the confining physical structure. Typically, these feeding devices have at least one part which can be pivoted into and out of the interior of that confining physical structure thus to provide access to the feeding device from outside the confining structure.

However, many confined animals pick at, scratch at, bite at, or otherwise disturb objects inside of their confining physical structure, including parts of a feeding device. Accordingly, parts of a feeding structure which pivot inside of a confining physical structure are often subject to such animal induced abuse, and thus experience more damage, and quicker wear than parts of the feeding structure which remain on the outside of a feeding structure. In addition, picking at, scratching at, biting at, or otherwise disturbing parts of a feeding device inside of a confining physical structure can cause injury to the animal or damage to the feeding structure which may enable the animal to escape.

It is an object of this invention to provide an animal feeding device which mounts to the exterior of a confining physical structure.

It is a more specific object to provide an animal feeding device which enables a user to avoid reaching inside an animal confining physical structure while the user performs feeding related maintenance tasks.

It is yet another object to provide an animal feeding device which enables a user to selectively prevent an animal from leaving the confining physical structure through the animal feeding device, while the user performs feeding related maintenance tasks.

SUMMARY

Feeder apparatus of the invention comprise a mounting structure, a body, and a feed holder. The mounting structure is adapted to mount the feeder apparatus on the outside of a cage wall and can comprise a coincident pair of mounting flanges, e.g. a first mounting flange and a second mounting flange. The mounting flanges can be collectively adapted for sliding communication relative to each other, so as to accommodate differing thicknesses, in cage walls, between the first mounting flange and the second mounting flange. Extending outwardly from the mounting structure is a feeder body adapted to slidingly receive a feed holder therein.

Accordingly, when feeder apparatus of the invention is mounted to a cage wall, one mounting flange in located inside of the cage. The remaining structure of the feeder apparatus is located outwardly of the cage, thereby enabling an animal owner/caretaker to access the feeder apparatus without having to open the cage.

In a first family of embodiments, a feeder apparatus comprises a plurality of walls connected to each other and adapted to extend outwardly of such cage in a generally common direction, and thereby defining a feeder body and an inner space, inside the feeder body and generally surrounded by the walls, the feeder body having a first opening adapted to communicate with a corresponding opening in such cage, and a second opening adapted to receive and hold a feed holder outside such cage, at least one of the walls comprising receiving structure; mounting structure connected to and extending away from the feeder body, the mounting structure comprising a cage-facing surface, and a feeder-facing surface; and a feed holder having at least one lateral guide, the at least one lateral guide being received by the receiving structure of the at least one of the walls.

In some embodiments, the feeder body has a length (L) corresponding to a length of at least one of the walls in the generally common direction; at least one of the walls having a channel formed therein extending along the direction of length (L) as the receiving structure.

In some embodiments, the receiving structure comprises a channel having an open channel minimum height dimension (H); at least one the lateral guide of the feed holder comprising an elongate projection having a maximum thickness dimension (T1), the magnitude of height dimension (H) being greater than the magnitude of the maximum thickness dimension (T1).

In some embodiments, the at least one lateral guide comprises an elongate projection of the feed holder, having maximum thickness dimension (T1); the receiving structure of the at least one wall comprising a channel defining an opening having a channel minimum height dimension (H), magnitude of channel minimum height dimension (H) being greater than magnitude of maximum thickness dimension (T1).

In some embodiments, the mounting structure comprises a first flange extending outwardly from the feeder body, the first flange having an opening extending toward the inner space inside the feeder body; the feeder apparatus further comprising; a second flange communicating with the first flange, the second flange having an opening extending therethrough; the opening of the second flange being adapted and configured to be generally aligned with the opening of the first flange, such that the opening of the second flange is in generally concentric relationship with the opening of the first flange.

In some embodiments, the feeder apparatus further comprises a locking mechanism, the locking mechanism communicating with each of the feeder body and the feed holder, the locking mechanism being adapted to generally restrain the feed holder relative to the feeder body, thereby to prevent unintended removal of the feed holder from the feeder body.

In some embodiments, at least one of the walls defining a hood having a surface generally rotated about an axis, the hood having a first lateral edge and a second lateral edge, each of the first lateral edge and the second lateral edge of the hood being attached to others of the walls.

In some embodiments, the inner space defined inside the feeder body generally defines a feeder body compartment; the feeder body further comprising a bottom extending between ones of the walls; the bottom having an opening extending therethrough; the bottom of the feeder body generally superposing the feed holder; whereby the opening which extends through the bottom provides access to the feed holder from within the inner space of the feeder body.

In some embodiments, each of a first one of the walls and a second one of the walls have an inner surface thereof, the respective inner surfaces of the first and second walls generally facing each other, the first and second walls defining respective first and second channels therein; the channels being adapted to receive at least first and second ones of the at least first lateral guide of the feed holder.

In some embodiments, ones of the walls have channels formed therein, the channel in each of the walls being generally aligned with the respective the channel in another one of the respective the walls, each the channel extending away from the mounting structure.

In some embodiments, the feeder apparatus further comprises a bottom closure plate having a maximum plate thickness (T2); the receiving structure comprising a channel defining an opening having a channel minimum height dimension (H); the magnitude of the channel minimum height dimension (H) being greater than the magnitude of the plate maximum thickness (T2) whereby the channel is adapted to receive the bottom closure plate therein.

In some embodiments, the receiving structure comprises a channel defining an opening having channel minimum height dimension (H); the at least first lateral guide of the feed holder comprising an elongate projection having a maximum thickness dimension (T1); such apparatus further comprising a bottom blocking plate having a maximum plate thickness (T2); the magnitude (H) of the channel minimum height dimension being greater than the sum of the magnitudes of (T1) and (T2), whereby the channel is adapted to receive, and to concurrently hold, both the feed holder and the bottom blocking plate.

In some embodiments, the mounting structure comprises a channel having an open channel minimum height dimension (H); such apparatus further comprising a closure plate having a maximum plate thickness (T2), the magnitude of the channel minimum height dimension (H) being greater than the magnitude of the plate maximum thickness (T2) whereby the channel is adapted to receive the bottom closure plate therein.

In some embodiments, at least one of the walls comprises a channel having an open channel minimum height dimension (H); such apparatus further comprising a closure plate having a maximum plate thickness dimension (T2); the magnitude of the channel minimum height dimension (H) being greater than the magnitude of the plate maximum thickness (T2) whereby the channel is adapted to receive the bottom closure plate therein.

In some embodiments, the mounting structure comprises a closure plate being adapted to be moved between a first position (CP1) and a second position (CP2).

In some embodiments, the feeder body comprises a closure plate being adapted to be moved between a first position (CP1) and a second position (CP2).

In some embodiments, a confining physical enclosure is adapted for confinement of an animal, and for providing foodstuff to such animal, the confining physical enclosure comprising a feeder apparatus.

In a second family of embodiments, the invention comprehends a feeder apparatus comprising a feeder body comprising a plurality of walls connected to each other, defining an inner space generally surrounded by the walls, the feeder body having a first opening and a second opening extending thereinto, each of the first and second openings being generally collectively surrounded by the plurality of walls, mounting structure connected to the feeder body, the mounting structure comprising a first flange having a first perimeter defining a first opening extending through the first flange, and a second flange having a second perimeter defining a second opening extending through the second flange, a feed holder removably attached to the feeder body, at least one of the first and second flanges having a protrusion extending therefrom and adapted to communicate with the other of the first and second flanges.

In some embodiments, an innermost edge of the first perimeter of the first flange defines a first length (L1) across the first opening, an outermost edge of the second perimeter of the second flange defining a second length (L2) across the second opening, the magnitude of length (L1) being greater than the magnitude of length (L2).

In some embodiments, the protrusion of at least one of the first flange and the second flange communicating with the innermost perimeter of the other one of the first flange and the second flange.

In some embodiments, the protrusion of at least one of the first flange and the second flange defines an outermost perimeter which corresponds to such innermost perimeter of the other of the first flange and the second flange, whereby the protrusion is adapted to slidingly communicate with such innermost perimeter of the other of the first and second flange.

In some embodiments, the first flange is attached to the feeder body; the protrusion extending from the second flange, the first flange being adapted to slidably receive the protrusion of the second flange.

In some embodiments, the first flange is attached to the feeder body; the protrusion extending from the first flange, the second flange being adapted to slidably receive the protrusion of the first flange.

In some embodiments, the feeder body has an upper portion, a lower portion, and a bottom having an opening therein, the lower portion of the feeder body having a plurality of channels formed therein, the feed holder having a plurality of rails adapted to slide into the channels thereby to close the bottom.

In a third family of embodiments, the invention comprehends a feeder apparatus comprising a feeder body comprising a plurality of walls connected to each other, defining an inner space, inside the feeder body and generally surrounded by the walls, the feeder body having a first opening and a second opening extending thereinto, each of the first and second openings being collectively surrounded by ones of the plurality of walls mounting structure connected to and extending away from the feeder body, the mounting structure comprising a cage-facing surface, and a feeder-facing surface, a feed holder removably attached to the feeder body; and a locking mechanism communicating with each of the feeder body and the feed holder, the locking mechanism being adapted to selectively enable removal of the feed holder from the lower portion of the feeder body and to removably lock the feed holder to the feeder body.

In some embodiments, the locking mechanism is adapted to be moved between a first position (P1) and a second position (P2).

In some embodiments, the locking mechanism has a tab adapted to protrude across at least a portion of the feed holder thereby to releasably lock the feed holder to the feeder body.

In some embodiments, the lower portion of the feeder body defines a slot adapted to slidably receive the feed holder, the locking mechanism being adapted to protrude across the slot thereby to releasably lock the feed holder to the feeder body.

In some embodiments, the feeder body has a hood generally defining a top surface and a back surface of the feeder body, the hood having a slot formed therein, the locking mechanism being movably mounted to the slot of the hood.

In some embodiments, the feeder body has a hood generally defining a back surface of the feeder body, the hood having a slot formed therein, the locking mechanism being movably mounted to the slot of the hood, the locking mechanism being adapted to move between a first position (P1) and a second position (P2).

In some embodiments, the locking mechanism is removably attached to the feeder body.

In some embodiments, the locking mechanism has a feeder body facing surface and a protuberance extending therefrom, the feeder body having an aperture formed therethrough, the aperture being adapted to resiliently hold the protuberance of the locking mechanism therein.

In some embodiments, the locking mechanism further comprises a detent, the feeder body having a receptacle formed therein, the receptacle being adapted to be resiliently coupled with the detent.

In a fourth family of embodiments, the invention comprehends a feeder apparatus comprising a plurality of walls connected to each other and thereby defining a feeder body and an inner space inside the feeder body and generally surrounded by the walls, at least one of the walls further comprising a receiving structure, the plurality of walls including a first wall having a first opening extending therethrough, and a second wall having a second opening extending therethrough, the first wall and the second wall being generally perpendicular to each other, each the opening extending through the first and second wall being generally superposed by other ones of the plurality of walls, mounting structure connected to and extending away from the feeder body; and a feed holder having a bottom, and first and second sidewalls, each of the first and second sidewalls extending upwardly from the bottom of the feed holder, a slidable element extending from at least one of the first and second sidewalls, the slidable element being adapted to be slidingly received by the receiving structure, whereby the engagement of the slidable element and the receiving structure effectuates a load supporting relationship between the feeder body and the feed holder.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 1:
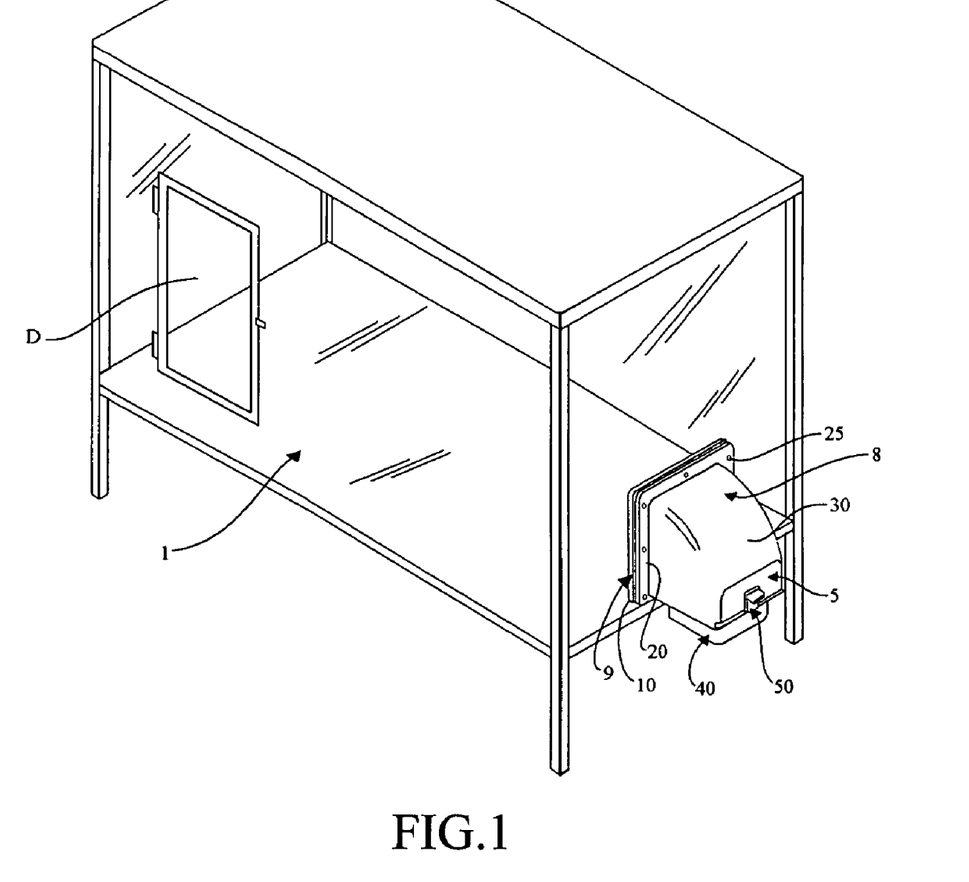
FIG. 1 shows a perspective view of a first embodiment of feeder apparatus of the invention installed on an animal confining physical enclosure.

FIG. 1 illustrates confining physical structure, e.g. cage 1, equipped with a first embodiment of feeder apparatus 5 of the invention. Feeder apparatus 5 of the invention is used to provide food, water, dietary supplements, and other forms of sustenance or medicines to pets and/or other animals, housed in the confine of cage 1.

In general, cage 1 is an enclosed structure for housing animals, e.g. birds, reptiles, rodents, mammals and other relatively common animals and/or relatively exotic animals. Cage 1 has a bottom wall, a top wall, and a plurality of side walls (none labeled).

Figure 8:
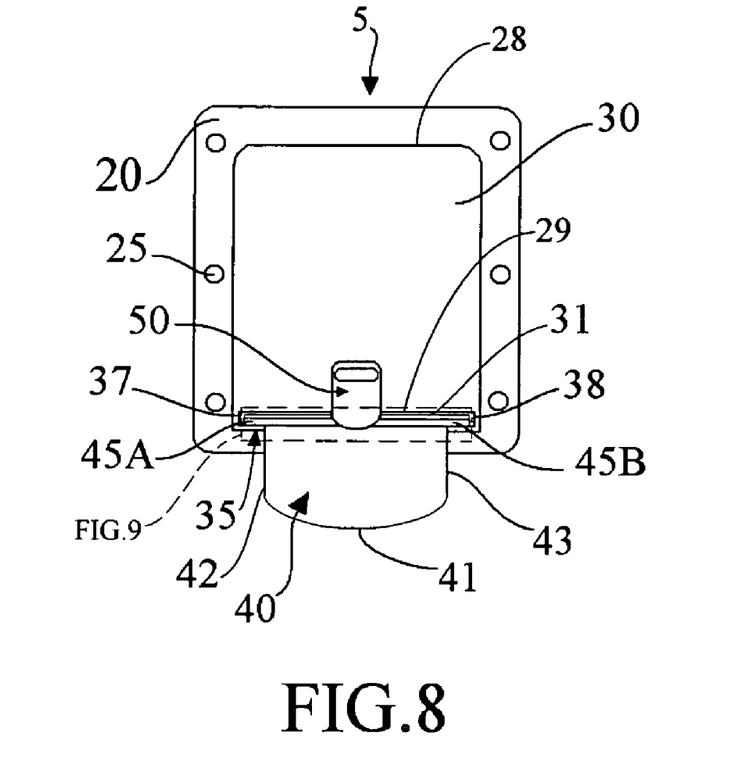
FIG. 8 shows a rear elevation view of the feeder apparatus of FIG. 3.

Feeder apparatus 5 has mounting structure 9 which typically comprises e.g. flange 10 and flange 20 adapted to be used to mount feeder apparatus 5 to cage 1. Feeder apparatus 5 further includes a feeder body 8 comprising a hood/enclosure, such as arcuate top wall 30, a plurality of walls and/or panels, e.g. side wall 32, side wall 33, and bottom wall 35 (FIG. 8). Feeder apparatus 5 also comprises a feed holder 40. In some embodiments, feeder apparatus 5 further comprises blocking plate 49 (FIG. 9) and/or a locking mechanism 50.

Figure 2:
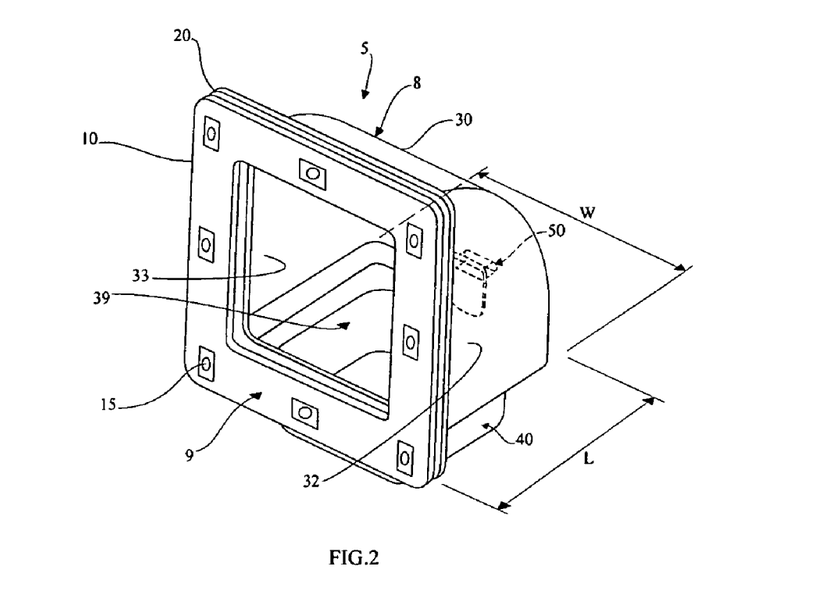
FIG. 2 shows a perspective view of the feeder apparatus of FIG. 1, removed from the animal confining physical enclosure.
Figure 3:
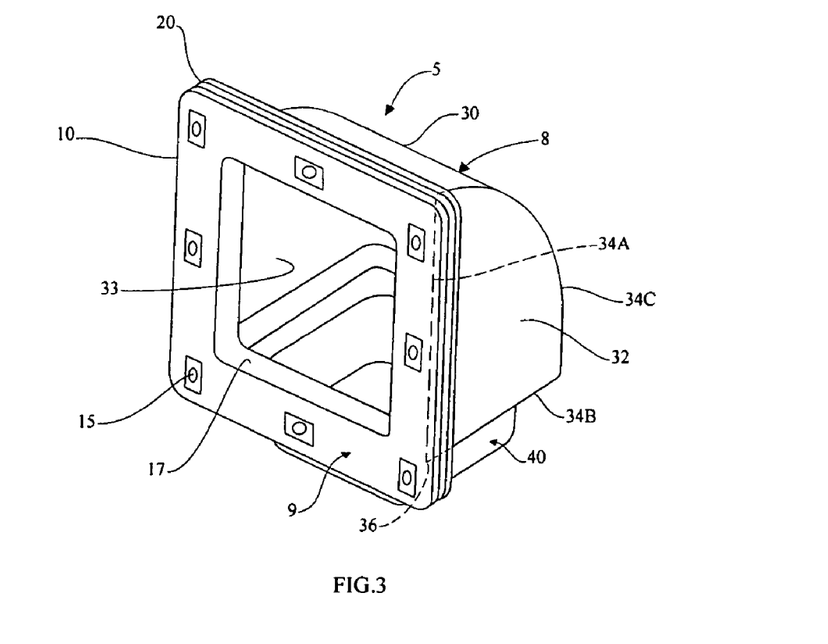
FIG. 3 shows a perspective view of a second embodiment of feeder apparatus of the invention.
Figure 6:
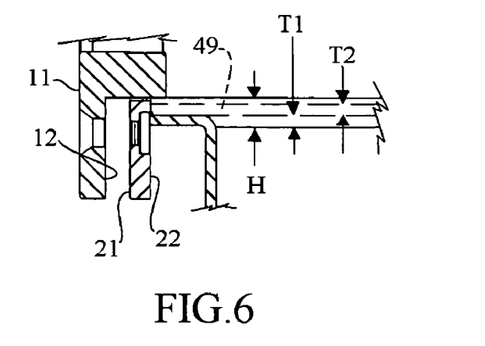
FIG. 6 shows an enlarged view of the mounting structure of the feeder apparatus of FIG. 3 and is taken at the dashed outline indicated in FIG. 5.

Referring to FIGS. 1–3, flange 10 is generally planar, has an outermost perimeter, and an innermost perimeter. The innermost perimeter of flange 10 defines an opening extending therethrough. Referring to FIG. 6, flange 10 has a first surface 11 facing in a first direction toward the interior of the cage, and a second surface 12 facing in a second, opposite direction away from the cage. Surface 11 and surface 12 are generally parallel to each other and thus generally define a thickness therebetween. Referring specifically to FIGS. 2–3, in some embodiments, flange 10 has at least one aperture 15 formed therethrough.

Figure 5:
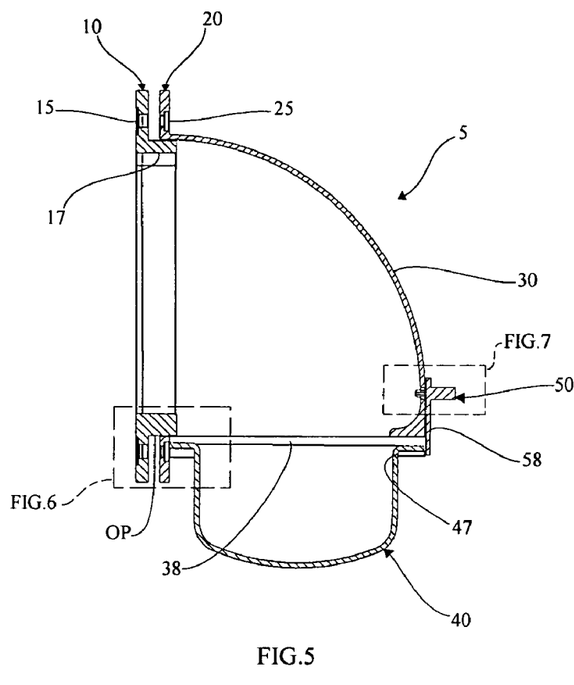
FIG. 5 shows a cross section of the feeder apparatus of FIG. 2 taken at 5—5 of FIG. 4.

Flange 20 is generally planar, has an outermost perimeter, and an innermost perimeter. The innermost perimeter of flange 20 defines an opening extending therethrough. Referring to FIG. 6, flange 20 has a first surface 21 facing a first direction toward the interior of the cage, and a second surface 22 facing a second, opposite direction away from the cage. Surfaces 21 and 22 are generally parallel and thus generally define a thickness therebetween. Referring to FIG. 5, in some embodiments, flange 20 has at least one aperture 25 formed therethrough.

Arcuate top wall 30 extends away from cage 1, outwardly of flange 20 and curves arcuately downwardly in progressing away from flange 20. As illustrated in FIG. 5, top wall 30 has an outwardly facing surface, an inwardly facing surface, and a generally arcuate profile. As illustrated in FIG. 8, top wall 30 has an upper edge 28 which generally communicates with flange 20, and a lower edge 29 displaced from flange 20. A pair of generally parallel lateral sides of top wall 30 extends between the upper edge and the lower edge of top wall 30. In some embodiments, a slot 31 is located at or adjacent the lower edge 29 of top wall 30, and extends from outside the feeder into the inner space inside the feeder body.

Side wall 32 is depicted as being generally planar, although such side wall can have a variety of configurations, and has two generally straight edges, e.g. first and second generally straight edges 34A, 34B and at least one other edge, e.g. a third relatively arcuate edge 34C where side wall 32 meets top wall 30. In some embodiments, first generally straight edge 34A and second generally straight edge 34B are perpendicular to each other. Accordingly, one of the first and second straight edges is typically oriented vertically when the feeder is mounted to a cage, whereby the other straight edge is oriented horizontally.

The vertical and horizontal straight edges of side wall 32 have a common first point of terminus 36 where the edges come together. Each of the vertical and horizontal straight edges has a second, non-common point of terminus where such edges approach the lower edge of top wall 30. A third generally arcuate edge extends between the non-common point of terminus of the vertical edge and the non-common point of terminus of the horizontal edge of side wall 32. The third generally arcuate edge communicates with a corresponding one of the lateral edges of top wall 30.

Like side wall 32, side wall 33 is depicted as being generally planar, although such side wall can have a variety of configurations, and has two generally straight edges, e.g. first and second generally straight edges 34A, 34B and at least one other edge, e.g. a third relatively arcuate edge 34C where side wall 33 meets top wall 30. In illustrated embodiments, first generally straight edge 34A and second generally straight edge 34B are perpendicular to each other. Accordingly, one of the first and second straight edges is typically oriented vertically when the feeder is mounted to a cage, whereby the other straight edge is oriented horizontally.

The vertical and horizontal straight edges of side wall 33 have a common first point of terminus 36 where the edges come together. Each of the vertical and horizontal straight edges has a second, non-common point of terminus where such edges approach the lower edge of top wall 30. A third generally arcuate edge extends between the non-common point of terminus of the vertical edge and the non-common point of terminus of the horizontal edge of side wall 33. The third generally arcuate edge communicates with a corresponding one of the lateral edges of top wall 30.

The vertical and horizontal straight edges of side walls 32, 33 can be other than straight, and can be oriented in other upright and generally lateral directions, other than respectively vertically and horizontally, by design choice without departing from the scope of the invention.

Bottom wall 35 is illustrated as being generally planar (FIG. 8). In some embodiments, bottom wall 35 has a length dimension which corresponds to feeder body length (L), a width dimension which corresponds to feeder body width (W), an upper surface and a lower surface. In preferred embodiments, the bottom wall has an opening 47 extending therethrough.

Bottom wall 35 comprises the lower most portion of feeder body 8. In some embodiments, bottom wall 35 comprises the structure which supports feed holder 40, e.g. channels 37, 38 and as expressed herein also includes the void extending between and/or through the feed holder support structure, e.g. opening 47.

Figure 9:
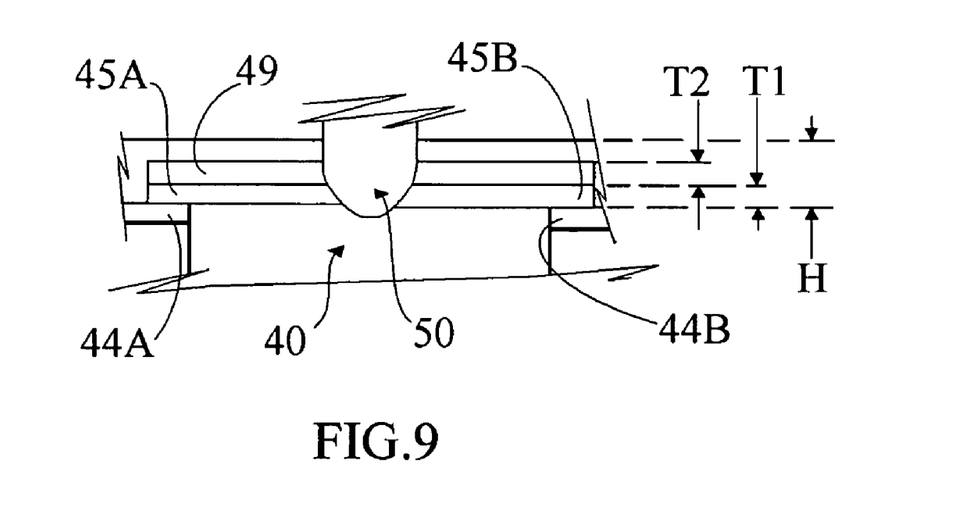
FIG. 9 shows an enlarged view of a portion of the feeder apparatus of FIG. 3 and is taken at the dashed outline indicated in FIG. 8.

Referring to FIGS. 8 and 9 in some embodiments, bottom wall 35 comprises two lateral segments which extend outwardly from the inner perimeter of flange 20, e.g. first and second lateral segments 44A, 44B. First and second lateral segments 44A, 44B of bottom wall 35 have a distance therebetween which corresponds to a width dimension of opening 47.

In some embodiments, feeder 5 further comprises channels 37 and 38. As illustrated in FIGS. 5, 6, and 8, channels 37 and 38 are receiving structures which extend generally along the horizontal edges of side walls 32 and 33 respectively adjacent the intersections of bottom wall 35 with side walls 32, 33. Referring specifically to FIG. 6, channel 37 has a minimum channel height dimension (H) defined by the minimum distance between the upper and lower surfaces of the channel.

As illustrated in FIG. 8, in some embodiments, feed holder 40 has a floor, namely bottom 41. Sides 42 and 43 of feed holder 40 extend upwardly from bottom 41 and define a space therebetween, which generally defines a feed-holding receptacle within feed holder 40 for receiving and holding foodstuff.

In some embodiments, at least one of sides 42, 43 includes a lateral guide, namely elongate projection or flange, as a slidable element, e.g. one of rails 45A and 45B. Referring to FIGS. 6 and 8, each of rails 45A and 45B has an upper surface, a lower surface and a thickness dimension (T1) therebetween.

Referring specifically to FIG. 6, in some embodiments, feeder 5 includes a blocking plate 49, which enables a user of feeder 5 to selectively restrict a confined animals' access to at least part of feeder 5. Plate 49 is preferably generally planar, has a width dimension, a length dimension, and an outer perimeter. Plate 49 has an upper surface, a bottom surface, and a thickness dimension (T2) therebetween.

Figure 7:
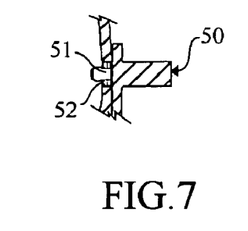
FIG. 7 shows a portion of the locking mechanism of the feeder apparatus of FIG. 3 and is taken at the dashed outline indicated in FIG. 5.

Referring to FIG. 2, in some embodiments, feeder 5 has a locking mechanism, e.g. lock 50 for selectively preventing the removal of feed holder 40 from the feeder body. Referring specifically to FIG. 7, in the illustrated embodiment, lock 50 includes a lock mounting mechanism, e.g. protuberance 51, which is a generally cylindrical projection adapted to be received into a corresponding opening, e.g. aperture 52 and/or other guide.

In some embodiments, aperture 52 is a generally annular opening formed through top wall 30. In the illustrated embodiments, lock 50 includes tab 58 adapted to selectively project across slot 31 when the lock is in the locking position.

Referring to FIGS. 1–3, cage 1 provides a wall upon which feeder 5 is mounted. The wall of cage 1 upon which feeder 5 is attached has an opening therethrough. In preferred embodiments, the opening through the wall of cage 1 generally follows the outline of the openings through flanges 10 and 20.

Referring to FIG. 5, in some embodiments, flanges 10 and 20 are oriented along generally parallel planes with edge portions of the cage wall, which surrounds the opening in the cage wall, between flanges 10 and 20. As seen in FIGS. 5 and 6, in the illustrated embodiments, a plurality of apertures 15 extend through flange 10 and are generally perpendicular to surfaces 11 and 12 of flange 10. Apertures 25 extend through flange 20 and are generally perpendicular to surfaces 21 and 22 of flange 20. In preferred embodiments, apertures 15 and 25 are aligned with each other when the inner perimeters of flanges 10 and 20 are coaxial with each other, enabling a single piece of fastening hardware to pass through both aperture 15 and aperture 25 as well as through the portion of the cage wall which surrounds the cage wall opening where the feeder is installed.

Figure 4:
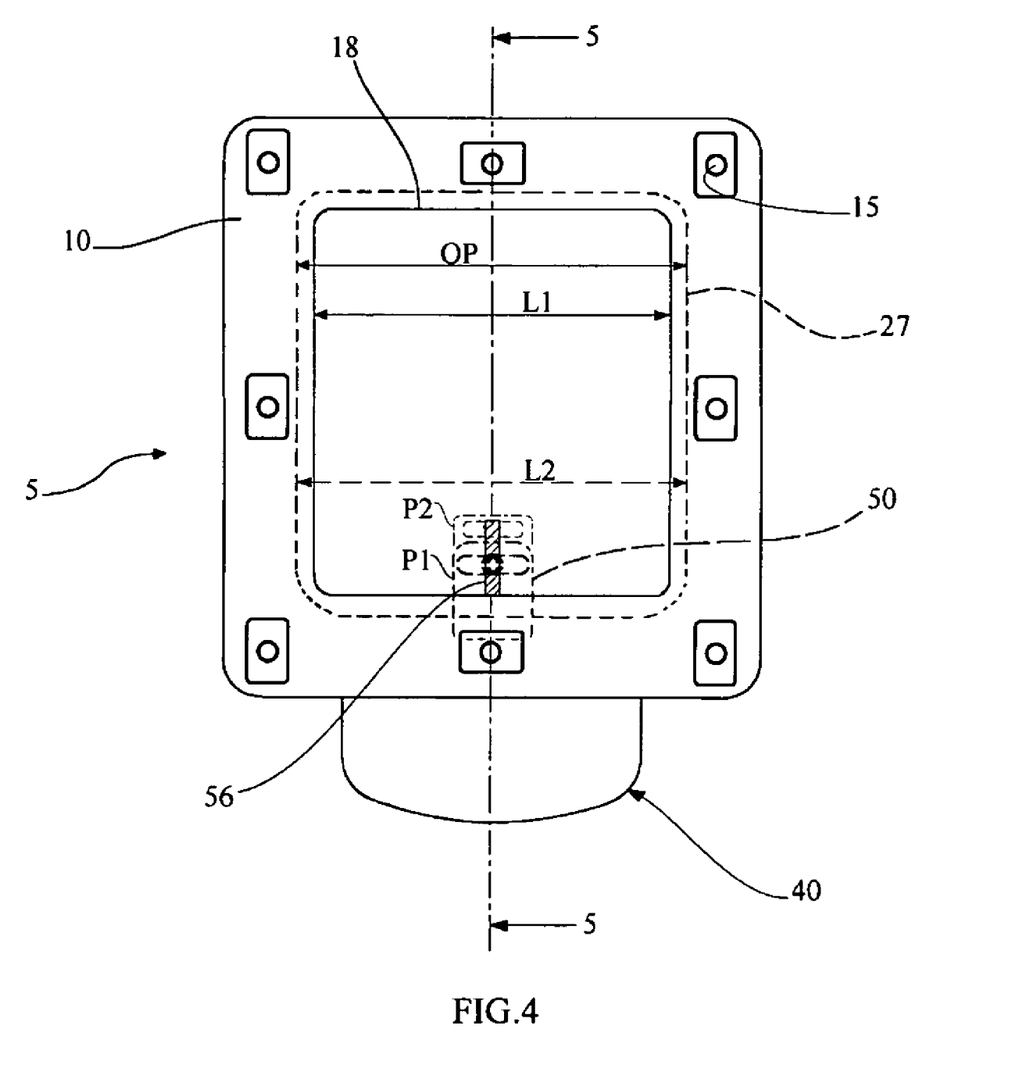
FIG. 4 shows a front elevation view of the feeder apparatus of FIG. 2

Referring to FIGS. 3 and 5, in some embodiments, flange 10 further comprises a protrusion, e.g. lip 17, which extends toward flange 20. As seen in FIG. 4, flange 10 has innermost perimeter 18 which defines opening length (L1) and an outer perimeter (OP) at lip 17. Flange 20 has innermost perimeter 27, which defines opening length (L2). In some embodiments, the magnitude of length (L2) is greater than the magnitude of the length across outer perimeter (OP) of lip 17 whereby, in the illustrated embodiments, lip 17 fits inside the opening defined at (L2).

In preferred embodiments, the opening extending through flange 20 is sized and configured to enable lip 17, and thus flange 10, to slidingly communicate therewith. In some embodiments, lip 17 is on flange 10 and extends into the opening in flange 20, as illustrated. In other embodiments, not shown, lip 17 is on flange 20, extending toward flange 10, whereby lip 17 extends toward the opening in flange 10.

FIG. 5 illustrates a preferred embodiment of top wall 30. As seen in FIG. 5, a portion of flange 20 is attached to the upper edge of top wall 30. From this attachment point, top wall 30 extends arcuately in a downwardly arching direction, forming an arc which may or may not be generated about a single point of origin. Referring to FIG. 8, in some embodiments, slot 31 is located at or adjacent the bottom edge of top wall 30. Slot 31 is a generally elongate opening, which spans between the generally parallel lateral edges of top wall 30.

Referring to FIG. 5, the shape of the profile of the arc, defined by top wall 30, corresponds generally to the shape of the arcuate edge of each of side walls 32 and 33, respectively. Accordingly, as illustrated in FIGS. 2 and 3, one of the generally parallel lateral edges of top wall 30 is joined to the arcuate edge of side wall 32. The other one of the generally parallel lateral edges of top wall 30 is joined to the arcuate edge of side wall 33.

The vertical edges of side walls 32 and 33 are joined to flange 20. The horizontal edges of side walls 32 and 33 are attached to the first and second lateral segments 44A, 44B of bottom wall 35, respectively. The cage-facing portion of bottom wall 35 is joined to flange 20. Accordingly, feeder 5 comprises an inner space 39 defined between top wall 30, side walls 32 and 33, and bottom wall 35.

Opening 47 (FIG. 5) is defined between the first and second lateral segments 44A, 44B of bottom wall 35. Opening 46 extends through bottom wall 35, thereby enabling access into inner space 39 defined inside feeder body of feeder 5, from below the feeder body.

Referring to FIG. 8, the magnitude of the distance between the first and second lateral segments 44A, 44B of bottom wall 35 corresponds generally to the width and configuration of feed holder 40. Accordingly, bottom wall 35 is adapted to receive feed holder 40, and to support feed holder 40, in lateral segments 44A and 44B. In some embodiments, bottom wall 35 comprises merely the structure which supports feed holder 40, e.g. the structure which defines channels 37, 38.

Channels 37 and 38 define the space between the upper and lower segments of the respective channel structure typically between upper surfaces of lateral segments 44A, 44B and lower surfaces of side walls 32, 33. In some embodiments, each of lateral segments 44A, 44B extends from one of side walls 32 and 33, and channels 37 and 38 are defined at the surface of lateral segments 44A, 44B, respectively. In some embodiments, the distal ends of slot 31 communicate with channels 37 and 38. In the illustrated embodiments, the magnitude of the slot opening height dimension of slot 31 corresponds to the magnitude of channel minimum height dimension (H) of channels 37 and 38.

Referring to FIG. 9, in preferred embodiments, both the magnitude of channel minimum height dimension (H), and the magnitude of the slot opening height dimension of slot 31, is greater than the sum of the magnitudes of thickness dimensions (T1) and (T2). Accordingly, channels 37 and 38 and slot 31 are adapted to simultaneously receive and house rails 45A and 45B respectively of feed holder 40, and blocking plate 49 where plate 49 overlies rails 45A, 45B.

Referring to FIGS. 1–5, in some embodiments, feed holder 40 generally characterizes, defines the lowermost portion of feeder 5. As illustrated in FIG. 8, in preferred embodiments, bottom 41 is generally concave. Sides 42 and 43 of feed holder 40 extend upwardly from lateral portions of bottom 41.

Sides 42 and 43 are joined to each other by a front panel and a back panel (not labeled). In preferred embodiments, bottom 41, side 42, side 43, and the front and back panels define a recess, e.g. a receptacle, in feed holder 40. The top of the receptacle is substantially open, enabling access into the receptacle of feed holder 40 from above. The opening of the receptacle has a shape and size which corresponds generally to the shape and size of the opening 47 which extends through bottom wall 35.

Typically, bottom wall 35 comprises lateral segments 44A, 44B which have a space therebetween, such as opening 47. The opening of the receptacle in feed holder 40 typically has length and width dimensions which correspond generally to length and width dimensions of opening 47 of bottom wall 35.

Referring to FIGS. 2 and 3, the opening extending through bottom wall 35 superposes, e.g. is generally above the receptacle of feed holder 40. The corresponding relationship between opening 47, through bottom wall 35 and into feed holder 40, enables the caged animal to have access to the receptacle of feed holder 40 from within the inner space of feeder 5.

In some embodiments rail 45A is joined to and extends outwardly from the upper portion of side 42 of feed holder 40, and rail 45B is joined to and extends outwardly from the upper portion of side 43 of feed holder 40. Rails 45A and 45B are sized and configured to be slidingly received into channels 37 and 38 respectively. In preferred embodiments, side walls 32 and 33, and rails 45A and 45B, are sufficiently strong/rigid to bear the load of feed holder 40, when rails 45A and 45B are inserted into channels 37 and 38 and can thereby block entrances/egress into or from cage 1 through bottom wall 35, when feed holder 40 is removed e.g. for servicing and/or filling.

The distance between channels 37 and 38 corresponds generally to the width dimension of blocking plate 49. The length of each of channels 37 and 38 corresponds generally to the length dimension of blocking plate 49. The magnitude of thickness dimension (T2) of blocking plate 49 is less than the magnitude of channel minimum height dimension (H) of channels 37 and 38. Accordingly, blocking plate 49 is cooperatively sized and configured along with channel 37, 38, so that blocking plate 49 can be slidingly received into channels 37 and 38.

Referring to FIG. 1, a user, e.g. an animal owner/caretaker, installs feeder 5 onto a wall of cage 1, e.g. a cage wall, as follows. First, the user makes an opening in the cage wall, sized and configured to snugly receive the outer surface of lip 17 on one of flanges 10, 12. The user orients the feeder body, including flange 20, on the exterior side of the cage wall in alignment with the opening in the cage wall, and positions flange 10 on the interior side of the cage wall.

From inside cage 1, the installer installing feeder 5 places flange 10 against the cage wall, placing surface 12 in physical communication with the interior side of the cage wall about the opening in the cage wall. From outside cage 1, the installer places flange 20 against the cage wall, e.g. the user places surface 21 in physical communication with the exterior side of the cage wall whereby flanges 10 and 20 are generally aligned with, and parallel to, each other, with portions of the cage wall between the flanges.

In preferred embodiments, apertures 15 are coaxial with corresponding apertures 25 as feeder 5 is being assembled to cage 1, which enables a user to insert fastening hardware such as screws, bots, clips, clamps, and the like, through corresponding aligned pairs of apertures 15 and 25. Preferably, holes (not shown) are also fabricated in the side wall of cage 1 in alignment with the pairs of apertures 15 and 25, whereby the fasteners draw flanges 10, 20 toward each other with the cage side wall trapped and held, between the flanges.

By securing the hardware through apertures 15 and 25, and optionally through the cage side wall, the user fastens flange 10 and flange 20 to each other with the cage side wall between flanges 10, 20, and correspondingly fastens flanges 10, 20, and thus feeder 5 to the cage wall.

In some embodiments, flange 10 has a depression, e.g. countersink formed where aperture 15 opens through surface 11. See FIG. 6. The countersink is adapted to receive e.g. the head of the mounting hardware therein. Accordingly, the countersink enables the mounting hardware, when tightened in mounting activity, to reside flush in the flange and to thereby not protrude beyond the surface of the flange, and into the cage.

In preferred embodiments, lip 17 on flange 10 extends through an opening in the cage wall and toward feeder body 8. In preferred embodiments, lip 17 away from flange 10, e.g. away from surface 12, a distance whose magnitude is greater than the magnitude of the thickness dimension of the cage wall. Accordingly, lip 17 extends completely through the cage wall and into flange 20 thus masking the cut edge of the cage wall from contact with the confined animal.

Since lip 17 extends into flange 20, lip 17 correspondingly covers the inner most portion of the distance, between surfaces 12 and 21, which separates flanges 10 and 20. Accordingly, lip 17 prevents the animal accessing the mounting hardware which extends through apertures 15 and 25, by reaching between flanges 10 and 20 at the opening in the cage wall.

In preferred embodiments, lip 17 extends sufficiently far outwardly of the cage side wall and thus outwardly of surface 12 of flange 10, toward feeder body 8 when mounted on the cage side, so that lip 17 spans the thickness of the side wall of cage 1 at the opening where the feeder is mounted, whereby lip 17 can effectively project beyond surface 12, into flange 20 when feeder 5 is installed on any of a wide variety of cage walls of differing thicknesses, thereby enabling feeder 5 to be mounted onto a variety of cage walls.

In other embodiments, lip 17 extends from flange 20, e.g. outwardly from surface 21 and is adapted to project a limited distance into flange 10 beyond surface 21. Lip 17 extends sufficiently far into flange 10 to cover the distance separating flanges 10 and 20.

Covering the distance separating flanges 10 and 20, and protecting the hardware extending between flanges 10 and 20 from access at the cut edge of the cage side wall, prevents the confined animal from picking at, scratching at, and/or otherwise disturbing the mounting hardware from inside cage 1 at the cut edge of the side wall.

Referring generally to FIGS. 1, 4 and 5, a user can remove feed holder 40 from feeder 5 without opening the main access door (D) of cage 1 and/or inserting his/her arm into cage 1. Instead, the user of feeder 5 can access feed holder 40 from the outside of cage 1.

As illustrated in FIGS. 4, 5 and 7, feed holder 40 can be removed through slot 31, out channels 37 and 38, by manipulating lock 50. In some embodiments, lock 50 can be temporarily or permanently removed from, e.g. pulled out of, aperture 52, thus removing the obstruction of lock 50 across slot 31.

Alternatively, lock 50, specifically tab 58, can be pivoted or slid out of the way of slot 31 so as to remove the obstruction of lock 50 across slot 31. Referring to FIG. 7, protuberance 51 can rotate within aperture 52. Accordingly, lock 50 pivots about aperture 52 at protuberance 51.

Referring to FIG. 4, in some embodiments, lock 50 can be slid in a generally linear path out of the way of slot 31 so as to remove the obstruction of lock 50 across slot 31. Lock 50 is restricted to a generally linear travel path by guide 56, enabling a user to bias lock 50 between a first position (P1) and a second position (P2).

When slot 31 is free from obstruction of lock 50, feed holder 40 can be slidably or otherwise removed from feeder 5. Feed holder 40 can be removed out the back of feeder 5, e.g. the portion most distant from cage 1, through slot 31. The configuration and orientations of channels 37 and 38 and feed holder 40, collectively, dictate the removal travel path of feed holder 40. As illustrated in FIGS. 1 and 5, in some embodiments, feed holder 40 is slidably removed in a direction generally perpendicular to flanges 10 and 20.

In preferred embodiments, both the magnitude of channel minimum height dimension (H), and the magnitude of the minimum slot opening height dimension of slot 31, are greater than the sum of the magnitude of thickness dimension (T1) and the magnitude of thickness dimension (T2), thus enabling blocking plate 49 and feed holder 40 to be simultaneously received and held within channels 37 and 38. Accordingly, a user can insert blocking plate 49 though slot 31, into channels 37 and 38 and over bottom wall 35 of the feeder while feed holder 40 is in place installed in feeder 5.

By inserting plate 49 into feeder 5 at slot 31, and channels 37, 38, prior to removing feed holder 40, the user provides a blocking plate which blocks the opening 47 though the bottom of the feeder, and thus blocks any and all possible escape routes by which the confined animal might escape, via the opening 47 which is defined through bottom wall 35 when the feed holder is removed.

Similarly a user can prevent possible escape of the confined animal when the feed holder 40 is being reinstalled in the feeder, by inserting/re-inserting feed holder 40 into feeder 5 while blocking plate 49 remains in place, held in channels 37 and 38 and slot 31 of the feeder.

Thus, blocking plate 49 can physically block access out of feeder 5 via the opening through bottom wall 35 during removal and insertion of feed holder 40, e.g. at any time the feed holder is out of feeder 5, from and into feeder 5. Accordingly, blocking plate 49 enables a user to remove feed holder 40 from feeder 5, fill/refill the contents of feed holder 40 and/or perform maintenance/repair upon feed holder 40, with confidence that the confined animal will not escape through bottom wall 35.

In alternative embodiments, channels 37 and 38, and a slot corresponding to slot 31, are located at at least one of mounting structure 9, side walls 32 and 33, or top 30, such that blocking plate 49 can be slidingly inserted into, and out of, the channels and slot, generally parallel to the cage wall through at least one of mounting structure 9, side walls 32 and 33, or top 30. Lock 50 is removably and/or slidably mounted to at least one of mounting structure 9, side walls 32 and 33 or top 30, via the coupling of protuberance 51 into a corresponding opening, e.g. aperture 52 and/or guide 56 extending through at least one of mounting structure 9, side walls 32 and 33, or top 30.

In some embodiments, channels 37 and 38 extend between the upper or lateral segments 44A, 44B and lower surface or side walls 32, 33. In some embodiments, channels 37 and 38 are formed into lateral segments 44A, 44B. In yet other embodiments, channels 37 and 38 are formed directly into side walls 32 and 33.

In alternative embodiments, channels 37 and 38 are not located on feeder body 8, rather are formed into feed holder 40, e.g. feed holder sides 42, 43 and/or feed holder rails 45A, 45B. In such embodiments, feeder body 8 has cooperatively sized and configured lateral guides/elongate projections, as slidable elements which receive channels 37 and 38 of feed holder 40.

In some embodiments, lateral guides/elongate projections, e.g. slidable elements extend from bottom wall 35, indeed the lateral guides can be the totality of the definition of bottom wall 35, and feed holder 40 has corresponding receiving structure, e.g. channels formed therein. In yet other embodiments, receiving structure, e.g. channels are formed into lateral portions of bottom wall 35, and feed holder 40 has corresponding lateral guides/elongate projections, e.g. slidable elements extending therefrom to interface with the channels of bottom wall 35.

In any event bottom wall 35 and/or side walls 32, 33 collectively cooperate with feed holder 40 in defining a sliding combination of channels and rails whereby feed holder 40 can be slid into a mounted position on the feeder body, and out of such mounted position, as desired by the user.

In alternative embodiments, a closure plate, e.g. blocking plate 49 is adapted and configured to generally remain within inner space 39 of feeder body 8, and move between a first position (CP1) and a second position (CP2). When blocking plate 49 is in the first position (CP1), the confined animal is generally permitted access to feed holder 40. When blocking plate 49 is in the second position (CP2), the confined animal is generally restricted from accessing feed holder 40.

Figure 10:
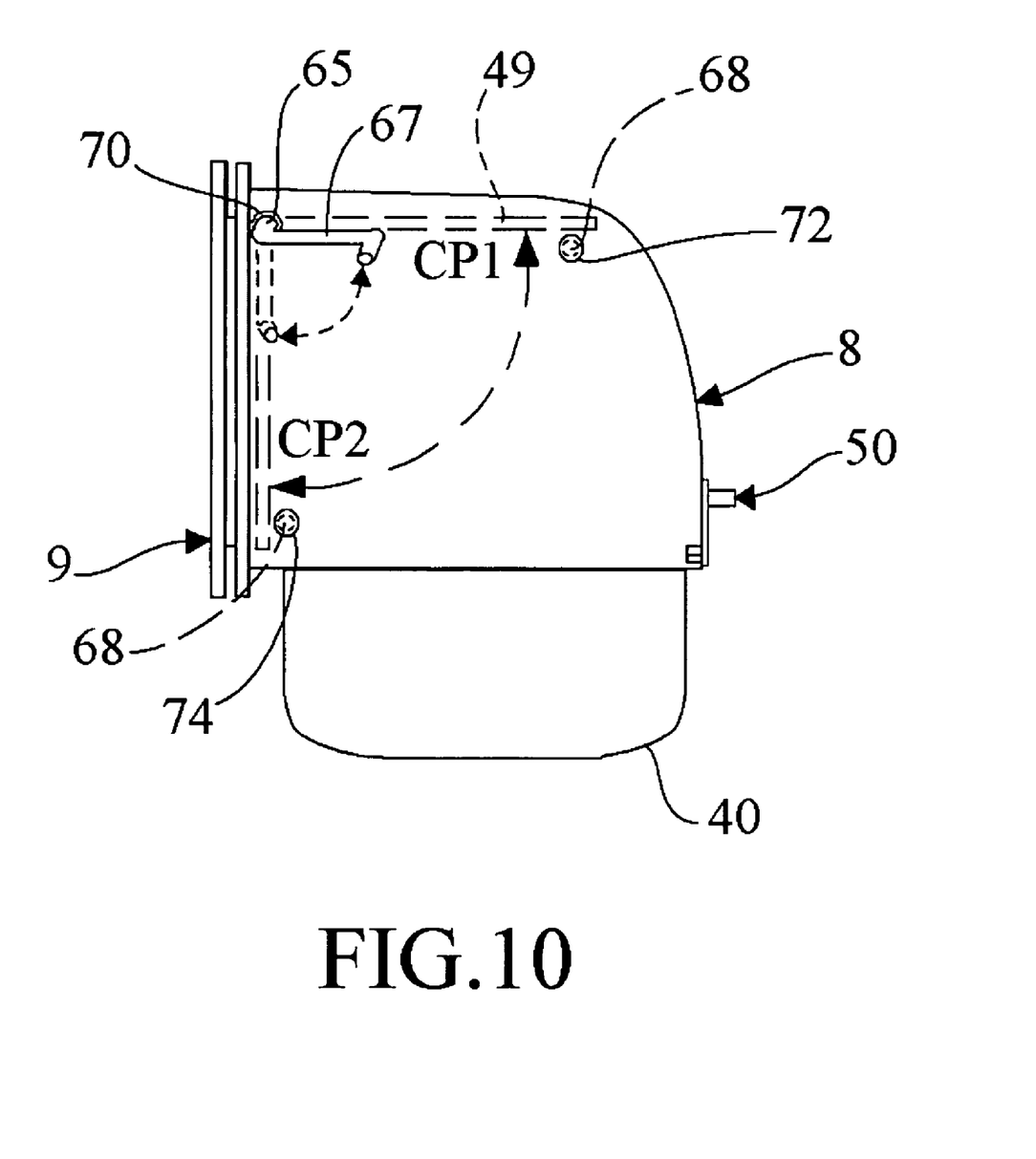
FIG. 10 shows a side elevation view of a third embodiment of feeder apparatus of the invention.

As illustrated in FIG. 10, in some embodiments, blocking plate 49 pivotably moves between first and second positions (CP1) and (CP2). At least one distal end of blocking plate 49 comprises a pin 65, which extends therethough, and is pivotably mounted to a corresponding pivotal mounting receptacle in mounting structure 9, e.g. apertures 70, which extend through mounting structure 9.

Commonly known means of pivotal attachment are suitable to pivotably join blocking plate 49 to at least one of mounting structure 9, top wall 30, side walls 32 and 33, and bottom wall 35. Such commonly known means of pivotal attachment include but are not limited to pivoting structure, e.g. pins and/or protuberances which extend outwardly from lateral edges of blocking plate 49 and corresponding pivot receiving structure, e.g. apertures and/or receptacles in mounting structure 9, top wall 30, side walls 32 and 33, and bottom wall 35.

In some embodiments, blocking plate 49 is adapted to pivot about a generally horizontal axis. Accordingly, blocking plate 49 pivots along a generally vertical arcuate travel path, e.g. upwardly and downwardly. In other embodiments, blocking plate 49 is adapted to pivot about a generally vertical axis whereby blocking plate 49 pivots along a generally horizontal arcuate travel path, e.g. from side to side.

Referring to FIG. 10, in some embodiments, pin 65 comprises lever 67 which is adapted and configured to enable a user of feeder 5 to rotate pin 65 and correspondingly pivotably move blocking plate 49 between first and second positions (CP1) and (CP2). In some embodiments, feeder 5 includes rod 68 which is adapted and configured to be held in apertures 72 and 74 and correspondingly to hold blocking plate 49 in first and second positions (CP1) and (CP2), accordingly whereby the confined animal is unable to manipulate plate 49 out of the down, closed position.

To enable the confined animal to access feed holder 40, a user of feeder 5 inserts rod 68 through apertures 72, underneath blocking plate 49, thereby restricting blocking plate 49 to first position (CP1). To prevent the confined animal from accessing feed holder 40 while feed holder 40 is out of feeder 5, a user of feeder 5 inserts rod 68 through apertures 74, behind blocking plate 49, thereby restricting blocking plate 49 to second position (CP2).

Preferably, feeder 5 is made of a material which resists corrosion, is relatively strong/durable and is safe for animals to be around and/or fed from. Those skilled in the art are well aware of certain metallic materials which posses such desirable qualities, and appropriate methods of forming such materials. Appropriate metallic materials include, but are not limited to, aluminum and/or stainless steel. Common industry methods of forming such metallic materials include shearing, bending, riveting, welding, extruding and others.

In preferred embodiments, feeder 5 is made of a polymeric material, which resists corrosion, is relatively strong/durable and is safe for animals to be around and/or fed from. Those skilled in the art are well aware of materials, which posses such desirable qualities, and appropriate methods of forming such materials.

Some suitable materials are various polymeric compounds, such as for example and without limitation, various of the polyolefins, such as a variety of the polyethylenes, e.g. high density polyethylene, or polypropylenes. There can also be mentioned such commodity polymers as polyvinyl chloride and chlorinated polyvinyl chloride copolymers. A wide variety of other materials, safe for contact with the living animal body, can also be used, as desired.

For any polymeric material employed in structures of the invention, any conventional additive package can be included such as, for example and without limitation, slip agents, anti-block agents, release agents, anti-oxidants, and plasticizers, to control e.g. processing of the polymeric material as well as to stabilize and/or otherwise control the properties of the finished processed product, also to control hardness, bending resistance, and the like. The suitable polymeric materials, alone or in combination with such additive packages, can be mixed in sufficient quantities to provide feeder 5 with a colored, opaque, or clear appearance as desired.

Common industry methods of forming such polymeric compounds will suffice to make feeder 5. Exemplary, but not limiting, of such processes are the commonly-known injection molding process, cast extrusion processes, and other known polymer melt-fabrication processes.

Feeder 5 is preferably manufactured as four components. The four components are, first, flange 10; second, preferably as an integral piece, flange 20, top wall 30 side walls 32, 33, bottom wall 35, and channels 37, 38; third, feed holder 40; and fourth, lock 50.

In the alternative, one or more of flange 20, top wall 30 side walls 32, 33, bottom wall 35, and channels 37, 38 can be separately fabricated, and then joined to each other by known fabrication procedures.

There can be mentioned, for example and without limitation, a wide variety of known joinder technologies such as chemical technologies, thermal technologies and/or mechanical technologies. Common industry methods of joining such materials, such as by using polymer adhesives, thermal bonding, and/or mechanical fasteners will suffice to join one or more of flange 20, top wall 30, side walls 32, 33, bottom wall 35, and channels 37, 38 to each other.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. Feeder apparatus adapted to be mounted to a cage, said feeder apparatus comprising:
   (a) a plurality of walls connected to each other and thereby defining a feeder body and an inner space inside said feeder body and generally surrounded by said walls,
      (i) at least one of said walls further comprising a receiving structure,
      (ii) said feeder body having a first opening adapted to communicate with a corresponding opening in such cage, and a second opening adapted to receive and hold a feed holder
      (iii) at least one of said walls overlapping ones of said first and second openings
   (b) mounting structure connected to and extending away from said feeder body; and
   a feed holder having a bottom, and first and second sidewalls, each of said first and second sidewalls extending upwardly from said bottom of said feed holder, at least one of said first and second sidewalls comprising a slidable element,
said slidable element being adapted to be slidingly received by said receiving structure, said feed holder selectably movable, along a generally straight-line linear path of travel, between a first feed holder position and a second feed holder position, said feed holder in said first feed holder position juxtaposed said mounting structure and said feed holder in said second feed position distal said mounting structure.

2. Feeder apparatus as in claim 1, said feeder body having a length (L) corresponding to a length of at least one of said walls in the generally common direction; at least one of said walls having a channel formed therein extending along the direction of length (L) of said receiving structure.

3. Feeder apparatus as in claim 1, said mounting structure comprising a first flange extending outwardly from said feeder body, said first flange having an opening extending toward the inner space inside said feeder body, said feeder apparatus further comprising; a second flange communicating with said first flange, said second flange having an opening extending therethrough; the opening of said second flange being adapted and configured to be generally aligned with the opening of said first flange, in use, a portion of one of said first and second flanges inserted into the other one of said first and second flanges, such that portion of one of said first and second flanges generally concentrically surrounds a portion of the other one of said first and second flanges.

4. Feeder apparatus as in claim 1, further comprising a locking mechanism, said locking mechanism communicating with each of said feeder body and said feed holder, said locking mechanism being adapted to generally restrain said feed holder relative to said feeder body thereby to prevent unintended removal of said feed holder from said feeder body.

5. Feeder apparatus as in claim 1 at least one of said walls defining a hood having a surface generally rotated about an axis, said hood having a first lateral edge and a second lateral edge, each of said first lateral edge and said second lateral edge of said hood being attached to others of said walls.

6. Feeder apparatus as in claim 1 wherein the inner space defined inside said feeder body generally defines a feeder body compartment; said feeder body further comprising a bottom extending ones of said walls; said bottom having an opening extending therethrough; said opening generally overlying said feed holder; whereby the opening which extends through said bottom provides access to said feed holder from within the inner space of said feeder body.

7. Feeder apparatus as in claim 1, each of a first one of said walls and a second one of said walls having an inner surface thereof, the respective inner surfaces of said first and second walls generally facing each other, said first and second walls defining respective first and second channels therein; said channels being adapted to receive at least one slidable element attached to said feed holder.

8. Feeder apparatus as in claim 1, ones of said walls having channels formed therein, said channel in each of said walls being generally parallel to the respective said channel in another one of the respective said walls, each said channel extending away from said mounting structure.

9. Feeder apparatus adapted to be mounted to a cage, said feeder apparatus comprising:
(a) a plurality of walls connected to each other and thereby defining a feeder body and an inner space inside said feeder body and generally surrounded by said walls,
  (i) at least one of said walls further comprising a receiving structure,
  (ii) said feeder body having a first opening adapted to communicate with a corresponding opening in such cage, and a second opening adapted to receive and hold a feed holder
  (iii) at least one of said walls overlapping ones of said first and second openings;
(b) mounting structure connected to and extending away from said feeder body;
(c) a feed holder having a bottom, and first and second sidewalls, each of said first and second sidewalls extending upwardly from said bottom of said feed holder, at least one of said first and second sidewalls comprising a slidable element, said slidable element being adapted to be slidingly received by said receiving structure, whereby the engagement of said slidable element and said receiving structure effectuates a load supporting relationship between said feeder body and said feed holder; and
(d) a bottom closure plate having a maximum plate thickness (T2); said receiving structure comprising a channel defining an opening having a channel minimum height dimension (H); the magnitude of the channel minimum height dimension (H) being greater than the magnitude of the plate maximum thickness (T2) whereby the channel is adapted to receive said bottom closure plate therein.

10. Feeder apparatus adapted to be mounted to a cage, said feeder apparatus comprising:
(a) a plurality of walls connected to each other and thereby defining a feeder body and an inner space inside said feeder body and generally surrounded by said walls,
  (i) at least one of said walls further comprising a receiving structure,
  (ii) said feeder body having a first opening adapted to communicate with a corresponding opening in such cage, and a second opening adapted to receive and hold a feed holder
  (iii) at least one of said walls overlapping ones of said first and second openings;
(b) mounting structure connected to and extending away from said feeder body; and
(c) a feed holder having a bottom, and first and second sidewalls, each of said first and second sidewalls extending upwardly from said bottom of said feed holder, at least one of said first and second sidewalls comprising a slidable element, said slidable element being adapted to be slidingly received by said receiving structure, whereby the engagement of said slidable element and said receiving structure effectuates a load supporting relationship between said feeder body and said feed holder;
wherein said receiving structure comprises a channel defining an opening having channel minimum height dimension (H); at least one of said slidable elements comprising an elongate projection having a maximum thickness dimension (T1);
such apparatus further comprising a bottom blocking plate having a plate maximum thickness (T2); the magnitude (H) of the channel minimum height dimension being greater than the sum of the magnitudes of (T1) and (T2), whereby said channel is adapted to receive, and to concurrently hold, both said feed holder and said bottom blocking plate.

11. Feeder apparatus adapted to be mounted to a cage, said feeder apparatus comprising:
(a) a plurality of walls connected to each other and thereby defining a feeder body and an inner space inside said feeder body and generally surrounded by said walls,
  (i) at least one of said walls further comprising a receiving structure,
  (ii) said feeder body having a first opening adapted to communicate with a corresponding opening in such cage, and a second opening adapted to receive and hold a feed holder
  (iii) at least one of said walls overlapping ones of said first and second openings;
(b) mounting structure connected to and extending away from said feeder body;
(c) a feed holder having a bottom, and first and second sidewalls, each of said first and second sidewalls extending upwardly from said bottom of said feed holder, at least one of said first and second sidewalls comprising a slidable element, said slidable element being adapted to be slidingly received by said receiving structure, whereby the engagement of said slidable element and said receiving structure effectuates a load supporting relationship between said feeder body and said feed holder; and
wherein said mounting structure comprises a channel having an open channel minimum height dimension (H);
such apparatus further comprising a closure plate having a maximum plate thickness (T2), the magnitude of the channel minimum height dimension (H) being greater than the magnitude of the plate maximum thickness (T2) whereby the channel is adapted to receive said bottom closure plate therein.

12. Feeder apparatus adapted to be mounted to a cage, said feeder apparatus comprising:
(a) a plurality of walls connected to each other and thereby defining a feeder body and an inner space inside said feeder body and generally surrounded by said walls,
  (i) at least one of said walls further comprising a receiving structure, (ii) said feeder body having a first opening adapted to communicate with a corresponding opening in such cage, and a second opening adapted to receive and hold a feed holder (iii) at least one of said walls overlapping ones of said first and second openings;

(b) mounting structure connected to and extending away from said feeder body; and (c) a feed holder having a bottom, and first and second sidewalls, each of said first and second sidewalls extending upwardly from said bottom of said feed holder, at least one of said first and second sidewalls comprising a slidable element, said slidable element being adapted to be slidingly received by said receiving structure, whereby the engagement of said slidable element and said receiving structure effectuates a load supporting relationship between said feeder body and said feed holder;

wherein at least one of said walls comprises a channel having an open channel minimum height dimension (H); such apparatus further comprising a closure plate having a maximum plate thickness dimension (T2); the magnitude of the channel minimum height dimension (H) being greater than the magnitude of the plate maximum thickness (T2) whereby the channel is adapted to receive said bottom closure plate therein.

13. Feeder apparatus as in claim 1 wherein said mounting structure comprises a closure plate being adapted to be moved between a first position (CP1) and a second position (CP2).

14. Feeder apparatus as in claim 1 wherein said feeder body comprises a closure plate being adapted to be moved between a first position (CP1) and a second position (CP2).

15. A cage adapted for confinement of an animal, and for providing foodstuff to such animal, said confining physical enclosure comprising feeder apparatus as in claim 1.

16. Feeder apparatus as in claim 1, said plurality of walls fixedly connected to each other, whereby when in use, said mounting structure and said feeder body are generally positionally static with respect to each other.

17. Feeder apparatus as in claim 3 wherein a portion of said second flange inserts into said first flange.

* * * * *

UNITED STATES PATENT AND TRADEMARK OFFICE
CERTIFICATE OF CORRECTION

PATENT NO.      : 7,055,462 B2                                    Page 1 of 1
APPLICATION NO. : 10/837872
DATED           : June 6, 2006
INVENTOR(S)     : Adam J. Keller It is certified that error appears in the above-identified patent and that said Letters Patent is hereby corrected as shown below:

IN THE CLAIMS column 16 line 23, insert -- (c) -- at the begining of line 23

[i.e., it should be: " (c) a feed holder…"]

Signed and Sealed this

Twenty-ninth Day of August, 2006

JON W. DUDAS
*Director of the United States Patent and Trademark Office*